United States Patent [19]

Ando

[11] Patent Number: 4,713,985
[45] Date of Patent: Dec. 22, 1987

[54] TRANSMISSION APPARATUS
[75] Inventor: Shimon Ando, Hitachi, Japan
[73] Assignee: Kabushiki Kaisya Advance Kaihatsu Kenkyujo, Tokyo, Japan
[21] Appl. No.: 33,870
[22] Filed: Apr. 6, 1987

Related U.S. Application Data

[63] Continuation of Ser. No. 913,581, Sep. 30, 1986, abandoned, which is a continuation of Ser. No. 739,105, May 30, 1985, abandoned.

[30] Foreign Application Priority Data

May 31, 1984 [JP] Japan .................. 59-112073

[51] Int. Cl.[4] .................. F16H 1/28; F16H 15/50
[52] U.S. Cl. .................. 74/804; 74/796; 74/805
[58] Field of Search .................. 74/804, 805, 793, 796

[56] References Cited

U.S. PATENT DOCUMENTS

| 1,738,662 | 12/1929 | Morison | 74/804 X |
|---|---|---|---|
| 1,831,577 | 11/1931 | Richer | 74/804 |
| 1,870,875 | 8/1932 | Scheuer | 74/805 |
| 2,906,143 | 9/1959 | Musser | 74/640 |
| 4,184,388 | 1/1980 | Sfredda | 74/793 |
| 4,487,091 | 12/1984 | Pierrat | 74/805 |
| 4,494,416 | 1/1985 | Evans | 74/119 |
| 4,505,163 | 3/1985 | Fallener | 74/793 X |
| 4,520,693 | 6/1985 | Sfredda | 74/804 |
| 4,539,867 | 9/1985 | Ishimi | 74/793 |
| 4,552,037 | 11/1985 | Distin, Jr. et al. | 74/805 |

FOREIGN PATENT DOCUMENTS 145784 1/1981 Fed. Rep. of Germany ........ 74/804
170549 9/1984 Japan .

Primary Examiner—Allan D. Hermann
Assistant Examiner—Dirk Wright
Attorney, Agent, or Firm—Finnegan, Henderson, Farabow, Garrett & Dunner

[57] ABSTRACT

A transmission apparatus having an annular casing formed integrally, in its inner face, with a plurality of wave-shaped inner teeth, a plurality of drive roll elements rolling along the toothed inner face of the annular casing, a carrier for swingably supporting the drive roll elements by means of associated connecting element, and a wave generator for cyclically urging the drive roll elements to radially displace while rolling along the toothed inner face, thereby urging the carrier element to exert thereon a drive force.

17 Claims, 22 Drawing Figures

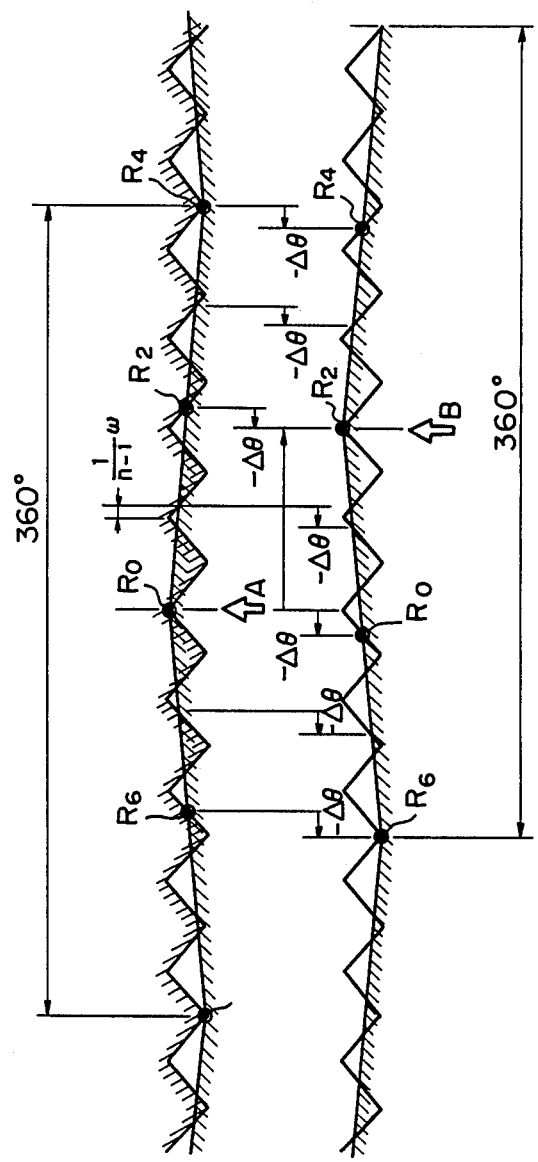

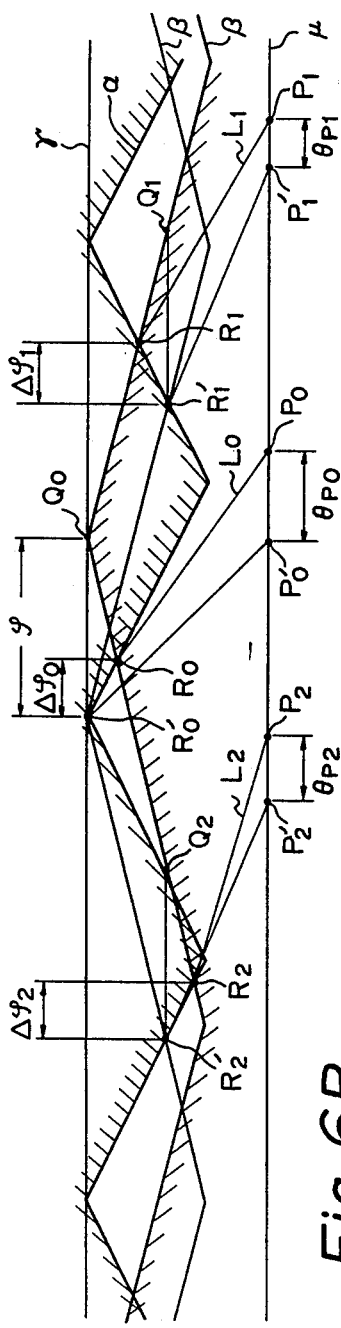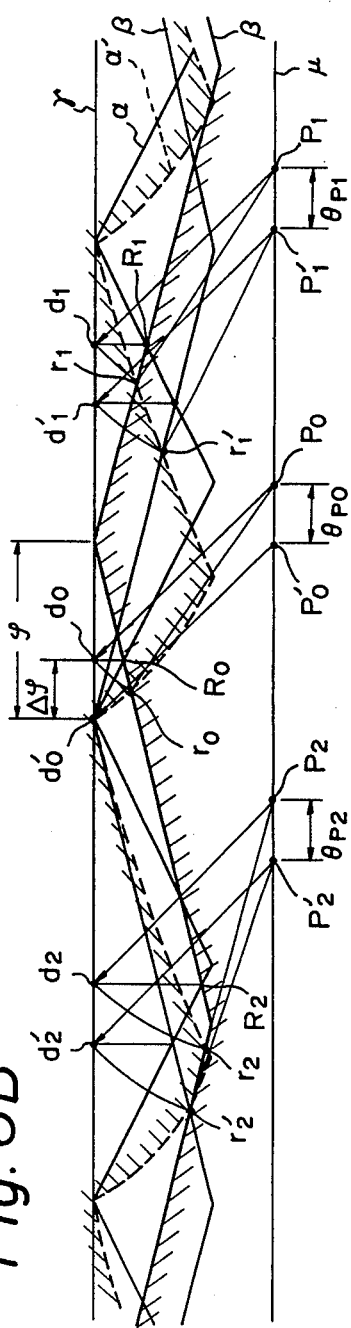
Fig. 6A
Fig. 6B

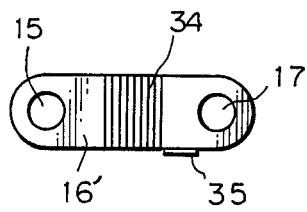
Fig. 16
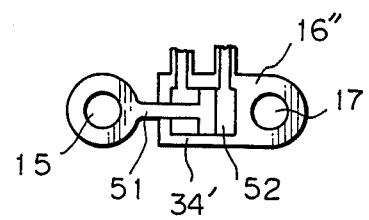
Fig. 17
Fig. 18
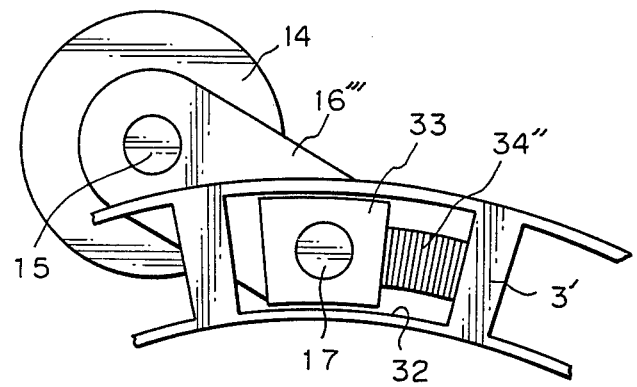

TRANSMISSION APPARATUS

This application is a continuation of application Ser. No. 913,581, filed Sept. 30, 1986, now abandoned, which is a continuation of application Ser. No. 739,105, filed May 30, 1985, now abandoned.

BACKGROUND OF THE INVENTION

1. Field of the Invention

The present invention relates to a transmission apparatus for transmitting drive power, suitable for use as a speed change gear accommodated in drive mechanisms of diverse kinds of computer-controlled machines, such as industrial robots.

2. Description of the Related Art

There are known speed change gears, especially speed reduction gears referred to as hypoid speed reduction gears and cyclo speed reduction gears, in which an externally toothed element is rotatably incorporated in an internally toothed element having a number of teeth larger than that of the externally toothed element. The externally toothed element is eccentrically moved in rotational engagement with the internally toothed element. A speed reduction effect is obtained from the externally toothed element due to the difference of the tooth numbers.

In such conventional speed reduction gears, since the externally toothed element from which a rotational output is taken moves eccentrically, an eccentricity absorption mechanism employing an Oldham's coupling or a pin-and-hole engagement mechanism is disposed between the externally toothed element and an output shaft. This kind of eccentricity absorption mechanism suffers from the problem of play appearing in the Oldham's coupling or the pin-and-hole engagement mechanism. In a conventional hypoid speed reduction gear or cyclo speed reduction gear, such play or backlash is rather large. Accordingly, the conventional hypoid or cyclo speed reduction gear is not suitable for use in drive mechanisms using a servo mechanism for positioning the driven element at a high speed and accuracy.

The present inventor previously proposed an improved speed reduction gear (Japanese Unexamined Patent Publication (Kokai) No. 59-170549) in which the externally toothed element is functionally divided into three separate elements, namely, drive roll elements rolling on the internal tooth surface of the internally toothed element, a carrier for carrying the drive roll elements, and a wave generator for providing the drive roll elements with a radial displacement. The improved speed reduction gear thus simultaneously reduces rotational speed and absorbs eccentric movement. However, since the drive roll elements are loosely held in the tooth spaces of the carrier, play appears in the holding portion of the drive roll elements. Also, sliding friction occurs between the drive roll elements and the carrier.

SUMMARY OF THE INVENTION

Accordingly, it is an object of the present invention to provide a transmission apparatus capable of eliminating the remaining defects in a conventional speed reduction gear.

Another object of the present invention is to provide a transmission apparatus free from any play and backlash and capable of transmitting drive power at a high efficiency without friction problems.

In accordance with the present invention, there is provided a transmission apparatus comprising an annular casing means formed, at its inner face, with wave-shaped inner teeth; at least three drive roll means rolling along the inner face of the annular casing means so as to follow the wave-shaped inner teeth; carrier means for swingably supporting at least the three drive roll means by means of connecting means; and wave generator means for cyclically providing the drive roll means with radial displacement. When the wave generator means faces the drive roll means to radially displace, the drive roll means swing so as to follow the wave-shaped inner teeth while generating output power.

BRIEF DESCRIPTION OF THE DRAWINGS

The invention will be made more apparent from the ensuing description of the embodiment with reference to the accompanying drawings, wherein:

FIG. 5 is a diagram similar to FIG. 4, illustrating the principle of a transmission apparatus of the present invention which exerts an output rotation reverse to an input rotation;

FIGS. 6A and 6B are diagrams illustrating the relationship between the position of the drive roll elements and that of the carrier element;

FIG. 16 is a schematic view of an internal actuator for causing displacement of the drive roll element, comprised of an electrostrictive material arranged in the transmission apparatus of the present invention;

FIG. 17 is an identical view with FIG. 16, illustrating another internal actuator for causing displacement of the drive roll element, comprised of a piston and a cylinder system;

FIG. 18 is a schematic partial view of a further internal actuator which is arranged inside the carrier element.

DESCRIPTION OF THE PREFERRED EMBODIMENTS

Figure 1:
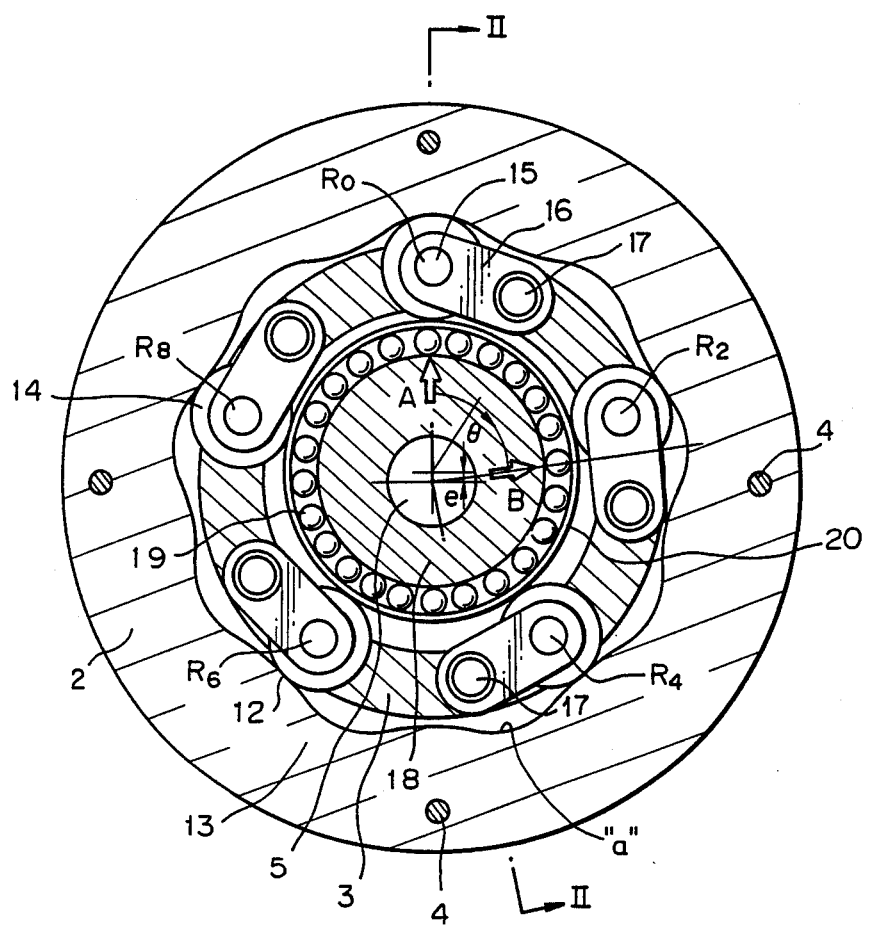
FIG. 1 is a cross-sectional view of a transmission apparatus, taken along line I—I of FIG. 2, according to an embodiment of the present invention.
Figure 2:
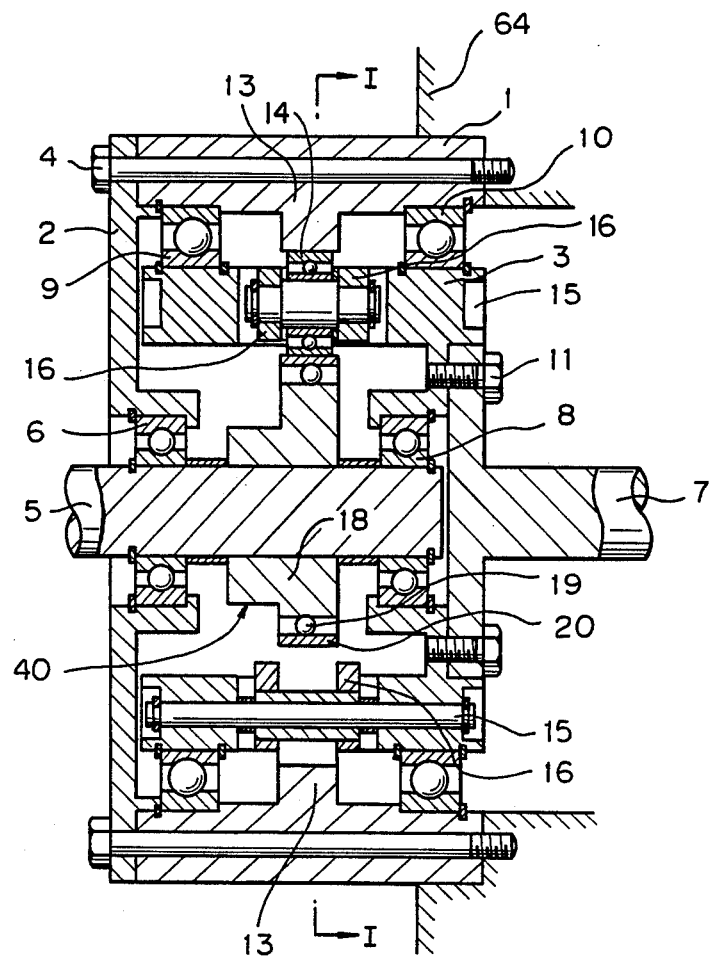
FIG. 2 is a vertical cross-section of the transmission apparatus, taken along line II—II of FIG. 1.

Referring to FIGS. 1 and 2, a transmission apparatus has an annular casing 1 and a covering 2 attached to the side face of the annular casing 1 by means of screw bolts 4, which also fix the casing 1 to a stationary base 64. A carrier element 3 is rotatably mounted in the annular casing 1 by means of bearings 9 and 10. The transmission apparatus further has an input shaft 5, rotatably supported by a bearing 6 arranged in the covering 2 and a bearing 8 arranged in the carrier element 3, and an output shaft 7, fixed to the carrier element 3 so as to be concentric to the input shaft 5. The annular casing 1 is provided with an integral internally toothed element 13 having at its inner face a plurality of equiangularly arranged wave-shaped teeth 12. On the input shaft 5, a cam element 18 is fixedly mounted so as to be eccentric from the center of the input shaft 5 by an eccentricity "e". A plurality of support rolling elements 19 in the shape of balls or rollers are arranged around the outer circumference of the cam element 18. A ring element 20 is arranged around the support rolling elements 19 so as to be in contact with these rolling elements 19.

The combination of the cam element 18, support rolling elements 19, and the ring element 20 is hereinafter referred to as a wave generator 40 and cyclically provides drive rolling elements 14, which are in contact with the ring element 20 of the wave generator 40, with radial displacement. That is, since the wave generator 40 has the support rolling elements 19 and the ring element 20 arranged around the outer circumference of the cam element 18, the rotation of the cam element 18 generates no rotational drive power but forces the drive rolling elements 14 to cyclically and radially move by the amount of eccentricity "e". The drive rolling elements 14 are respectively formed by a conventional bearing rotatable about its own axis. The drive rolling elements 14 are respectively pivoted to a pair of connecting elements 16 by means of a support shaft 15, as clearly shown in FIG. 2. The connecting elements 16 are swingably pivoted to the carrier element 3 by means of a support shaft 17. While the cam element 18 is being rotated together with the input shaft 5, the drive rolling elements 14 are cyclically moved in the radial direction by an amount 2e per one revolution of the cam element 18. As a result, the connecting elements 16 swing about respective support shafts 17.

In the embodiment of FIGS. 1 and 2, the internally toothed element 13 of the annular casing 1 has nine teeth 12. For each two teeth of the element 13, one drive rolling element 14 is provided. There are five rolling elements 14, i.e., rolling elements $R_0$, $R_2$, $R_4$, $R_6$, and $R_8$ in FIG. 1. It should be understood that these five rolling elements 14 are equiangularly spaced from one another but are arranged to be out of register with the teeth 12 of the internally toothed element 13. That is, the five rolling elements 14 are successively shifted in the circumferential direction with an increment of spacing corresponding to one pitch of the teeth 12 divided by the number (n=5) of the rolling elements 14 with respect to the teeth of the element 13. Therefore, when the cam element 18 is rotated from the position indicated by an arrow "A" in FIG. 1 to the position indicated by an arrow "B", i.e., when the cam element 18 is rotated through an angle corresponding to the two wavelengths of the tooth surface "a" of the teeth 12, for example, the rolling element 14 identified as the element $R_2$ is radially outwardly pressed by the ring element 20 of the wave generator 40. Thus, the rolling element 14 identified as the element $R_2$ rolls on the tooth surface "a" by an amount of one-fifth of the wavelength until the element $R_2$ is brought into the bottom of the wave-shaped teeth 12, where the rolling element $R_2$ is pressed against the bottom position in the same manner as the rolling element $R_0$ prior to rolling, as shown in FIG. 1. Since each rolling element 14 is connected to the carrier element 3 by the associated connecting element 16, the rolling of respective rolling elements 14 through an amount corresponding to approximately one-fifth of the wavelength of the wave-shaped teeth 12 causes a corresponding amount of rotation of the carrier element 3. Therefore, when the cam element 18 completes one revolution, the carrier element 3 is rotated by an amount corresponding to a speed reduction ratio of one complete revolution, i.e., the spacing between two adjacent intersecting points of the curves $\alpha$ and $\beta$ as described later.

As explained before, since the drive rolling elements 14 are formed by bearings, the drive rolling elements 14 are in rolling contact with the tooth surface "a" of the wave-shaped teeth 12. Further, the cam element 18 and the drive rolling elements 14 are in rolling engagement with one another via the support rolling elements 19 and the ring element 20. Therefore, the transmission apparatus of the embodiment of FIGS. 1 and 2 has an internal construction performing rolling contact and has no sliding contact portion.

In the above-described embodiment, the annular casing 1 may be made of metal, plastic, or ceramic materials. The material of which the carrier element 3, the drive rolling elements 14, and the cam element 18 are made are also selected from metal, plastic, or ceramic materials by taking wear resistance, rigitity, and light weight into consideration.

Figure 3:
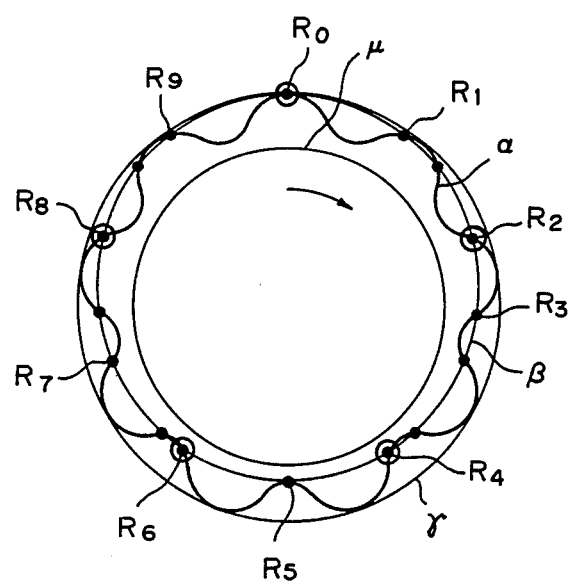
FIG. 3 is a schematic view of the transmission apparatus for explaining the principle of the present invention.

FIG. 3 illustrates a first curve $\alpha$ depicted by the center of respective drive rolling elements 14, i.e., the axis of respective support shafts 15 when the drive rolling elements 14 roll on the tooth surface of the wave-shaped teeth 12 of the internally toothed element 13, and a second curve $\beta$ depicted by the center of respective drive rolling elements 14, i.e., the axis of respective support shafts 15 when the drive rolling elements 14 roll on the outer circumference "b" of the ring element 20 of the wave generator 40.

It should be understood that in order to enable the drive rolling elements 14 to remain in constant contact with both the tooth surface "a" of the internally toothed element 13 and the outer circumference of the ring element 20, the drive rolling elements 14 have to be disposed on respective intersecting points of the curves $\alpha$ and $\beta$. In other words, if the drive rolling elements 14 are disposed on the intersecting points of the curves $\alpha$ and $\beta$, respectively, the drive rolling elements 14 can remain in constant contact with both the wave-shaped teeth 12 and the ring element 20 of the wave generator 40. Further, it is necessary for these intersecting points to continuously move in the circumferential direction at a constant speed in order that the transmission apparatus of this embodiment smoothly operate. Accordingly, the wave width of the curve $\alpha$ must always be equal to that of the curve $\beta$. Otherwise, there will be a case where a portion appears in the curve $\alpha$, which portion does not intersect the curve $\beta$. In that portion, the drive rolling elements 14 will fail to be in contact with either the wave-shaped teeth 12 or the ring element 20. However, if it is not necessary to exert a rotational drive force on the drive rolling element 14, it is possible to modify the shape of the curve $\alpha$ or $\beta$ so that no intersection occurs.

Figure 4:
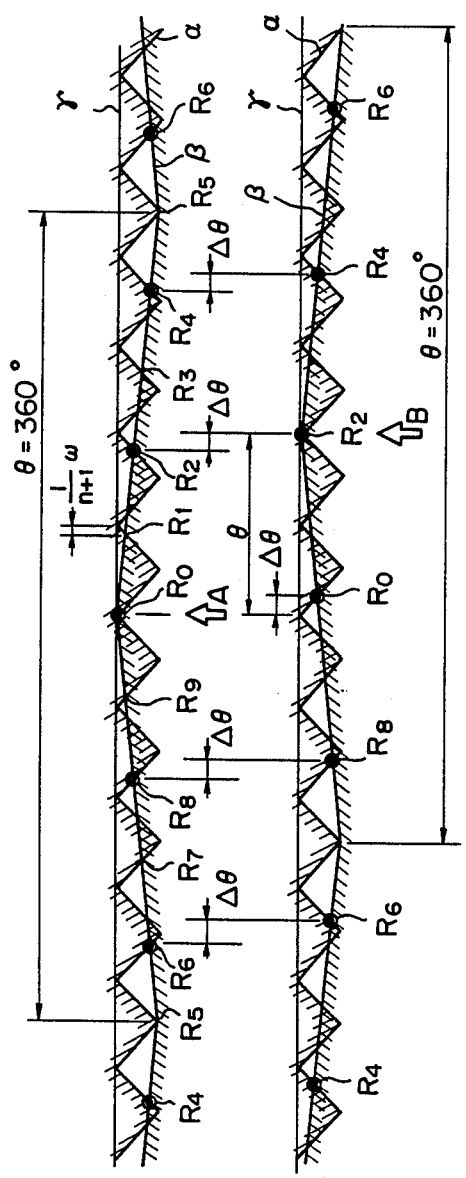
FIG. 4 is a diagram illustrating the laterally developed curves $\alpha$ and $\beta$ as well as the lines $\mu$ and $\gamma$.

Referring to FIG. 4, the curves $\alpha$ and $\beta$ are respectively developed and illustrated by pleated lines for simplicity. The hatched portions illustrate that the drive rolling elements 14 on the curves 60 and $\beta$ are restricted by the toothed surface "a" of the wave-shaped teeth 12 and the outer circumference "b" of the ring element 20. At this stage, if the pleated line $\alpha$ or $\beta$ is laterally shifted, the intersecting points of the two lines are also shifted. However, due to the restriction by the hatched portions, the drive rolling elements 14 on the radially shifting intersecting points, i.e., the points shifting upward in FIG. 4, are forced to generate moving force in the direction determined by the pleated lines $\alpha$ and $\beta$.

As will be understood from FIGS. 3 and 4, the curve $\beta$ of the embodiment of FIGS. 1 and 2 has one wavelength (one cycle) per revolution, while the number of cycles of the curve $\alpha$ is a whole multiple of the cycle of the curve $\beta$, i.e., nine cycles. This is because both curves $\alpha$ and $\beta$ form a closed curve, respectively, as shown in FIG. 3, so the whole multiple (n) of the wavelength of the curve $\alpha$ must be equal to the wavelength of the curve $\beta$.

Rotation of the cam element 18 in the direction shown by an arrow in FIG. 1 corresponds to rotating the curve $\beta$ of FIG. 3 in the same direction, i.e., shifting the pleated line $\beta$ rightward. Thus, if the curve or pleated line $\beta$ is moved, the intersecting points with the curve $\alpha$ are also moved. Therefore, the drive rolling elements 14 on the intersecting points produce moving power, respectively, due to the restriction given by the hatched portions of FIG. 4. The marks ⓞ in FIG. 4 indicate the intersecting points which move in the same direction as the curve $\beta$ or the pleated line $\beta$. The marks ⓞ in FIG. 5 indicate the intersecting points which move in the reverse direction to the curve or pleated line $\beta$.

From the illustrations of FIGS. 4 and 5, it will be understood that the number of the intersecting points is 2n (n is equal to the number of cycles of the curve $\alpha$ with one cycle of the curve $\beta$). That is, in the case of the embodiment of FIGS. 1 and 2, 2n is equal to 18. Out of the total number of 2n, the number of the intersecting points moving in the same direction as the curve $\beta$ is equal to n+1 (=10), and the number of the intersecting points moving in the reverse direction to the curve $\beta$ is equal to n−1 (=8). In the embodiment of FIGS. 1 and 2, five drive rolling elements 14, i.e., elements $R_0$, $R_2$, $R_4$, $R_6$, and $R_8$, are disposed on five points out of the intersecting points moving in the same direction. Thus, if the drive rolling elements 14 are disposed on the intersecting points moving in the same direction as the curve $\beta$, i.e., the moving direction of the cam element 18, the direction of the rotational output is the same as that of the rotational input. If the drive rolling elements 14 are disposed on the intersecting points moving in the reverse direction, the direction of the rotational output will be reverse to that of the rotational input.

When the curve $\beta$ is rotated clockwise by an angle "$\theta$", the intersecting points move. Thus, the drive rolling elements 14 identified by $R_2$ and $R_4$ move on the tooth surface "a" until the drive rolling element 14 identified by $R_2$ is pressed against the bottom of the wave-shaped teeth 12, as shown in FIG. 4. However, with the drive rolling elements 14 identified by $R_8$ and $R_0$, the curve $\beta$ moves away from the curve $\alpha$. Thus, the restriction on these drive rolling elements is lifted. Therefore, no moving force is exerted on the drive rolling elements 14 identified by $R_8$ and $R_0$. This means that movement of the intersecting points on which the drive rolling elements $R_8$ and $R_0$ are disposed does not cause any movement of these elements. The drive rolling element 14 identified by $R_6$ does not produce any moving force until the corresponding intersecting point reaches the peak of the wave-shaped teeth 12. However, after passing the peak, the element $R_6$ produces a moving force. If the drive rolling elements $R_0$ and $R_8$ that do not produce moving force are operatively connected to the drive rolling elements $R_2$ and $R_4$ that produce moving force, the entire assembly of the drive rolling elements 14 may constantly move.

In the transmission apparatus of the embodiment of FIGS. 1 and 2, all drive rolling elements 14 are connected to the carrier element 3 by means of the connecting elements 16. However, in order to obtain smooth rotation of the carrier element 3, each drive rolling element 14 has to operate so as to always cause an identical amount of rotation of the carrier element 3 while each drive rolling element 14 is in the phase of exerting a moving force in response to the rotation of the cam element 18. At the same time, each drive rolling element 14 which is not in the phase of exhibiting moving force must also move by the same amount as the carrier element 3.

From the foregoing explanation, it will be understood that the movement of the drive rolling elements 14 must be controlled so that the carrier element 3 always rotates at a constant speed. Thus, the wave-shaped teeth 12 of the internally toothed element 13 and the wave generator 40, which restrict the movement of the drive rolling element 14, must be designed so as to have specific shapes.

A description will be made of the relationship between the moving amount of intersecting points of the curves $\alpha$ and $\beta$ and the rotational amount of the carrier element 3.

FIGS. 6A and 6B illustrate the curves $\alpha$ and $\beta$ indicated plainly by the pleated lines. In this case, the wave widths of the two curves $\alpha$ and $\beta$ are identical, and the wavelength of the curve $\beta$ is selected to be twice that of the curve $\alpha$. It is now assumed that the drive rolling elements 14 are disposed at the intersecting points which move in the same direction as the curve $\beta$. Line $\mu$ in FIGS. 6A and 6B corresponds to a circle which passes through the axes of support shafts 17 pivotally supporting the connecting element 16 on the carrier element 3. Line $\gamma$ in FIGS. 6A and 6B corresponds to a circle which passes through the axes of support shafts 15 of $R_0$ and is concentric with the center of the input shaft 5. In the developed illustration of FIGS. 6A and 6B, the lines $\mu$ and $\gamma$ are straight lines. It should be appreciated that the line $\gamma$ may be any arbitrary circle. However, for convenience sake, in FIGS. 3 and 6B, the line $\gamma$ is selected to be the circle mentioned above.

In FIG. 6A, when the curve $\beta$ rotates through an angle $\phi$, the drive rolling elements disposed on the intersecting points $R_0'$, $R_1'$, and $R_2'$, of the curves $\alpha$ and $\beta$ accordingly move to the positions $R_0$, $R_1$, and $R_2$, respectively. From the points $R_0'$, $R_1'$, and $R_2'$, horizontal lines are drawn so as to intersect the curve $\beta$. The intersecting points are designated by $Q_0$, $Q_1$, and $Q_2$. The triangles $R_0'R_0Q_0$, $R_1'R_1Q_1$, and $R_2'R_2Q_2$ are congruent with one another. Therefore, the three line components $\overline{R_0'R_0}$, $\overline{R_1'R_1}$, and $\overline{R_2'R_2}$ are equal to one another. As a result, line components $\Delta\phi_0$, $\Delta\phi_1$, and $\Delta\phi_2$, which are projections of the above-mentioned three line components onto the line $\gamma$, are also equal to one another. However, the drive rolling elements 14 are connected to the carrier element 3 by means of the connecting elements 16 ($L_0$, $L_1$, and $L_2$ in FIGS. 6A and 6B). Since the carrier element 3 is horizontally moved in FIGS. 6A and 6B, the amount of movement given by respective drive rolling elements to the carrier element 3 becomes $\overline{P_0'P_0}$, $\overline{P_1'P_1}$, and $\overline{P_2'P_2}$, which are uneuqal to one another. This is because the connecting elements supporting respective drive rolling elements are arranged so as to be different in their inclinations with respect to the horizontal line.

In the case where the drive rolling elements are connected to the carrier element by means of rigid elements, the amount of movement of the carrier element given by the drive rolling elements must always be equal to one another in order to obtain smooth movement of the carrier element. That is, the above-mentioned amount of movement of the carrier element $\overline{P_0'P_0}$, $\overline{P_1'P_1}$, and $\overline{P_2'P_2}$ must be made equal. To achieve this, i.e., in order that the carrier element rotate at a constant speed when the curve $\beta$ moves at a constant speed, the drive rolling elements have to move at specific unequal speeds. Therefore, the shape of the wave-shaped teeth 12 of the internally toothed element 13 or the shhpe of the wave generator 40 must be amended so that either the curve $\alpha$ or $\beta$ is changed from that shown in FIGS. 6A and 6B.

Figures 7A, 7B:
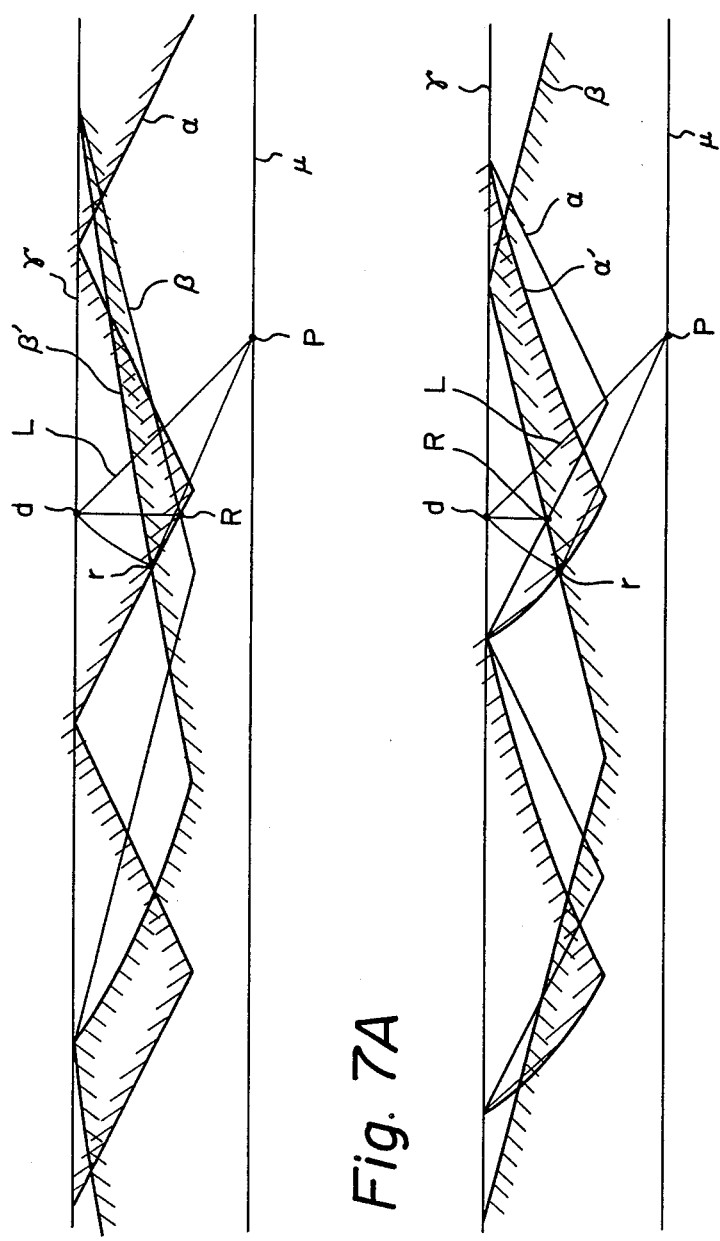
FIGS. 7A and 7B are developed schematic views for explaining a method of producing amended curves $\alpha$ and $\beta$ in order to provide the carrier element with a constant displacement by the rotation of the curve $\beta$ regardless of the position of the drive roll elements.

At this stage, if it is assumed that the curve $\beta$ is left unchanged, the shape of an amended curve $\alpha'$ for achieving a constant speed movement of the carrier element can be easily determined by the relationship between the curves $\alpha$ and $\beta$ illustrated in FIG. 7A. That is, let a vertical line be drawn from the intersecting point R of the curves $\alpha$ and $\beta$ to the line $\gamma$ so as to obtain an intersecting point d. Subsequently, a circle passing through the point d is depicted about a point P to obtain an intersecting point "r" of the circle and the curve $\beta$. This point "r" becomes a point located on amended wave-shaped teeth 12. Since $\overline{rP}$ is equal to $\overline{dP}$, the position of the point P is unchanged about the two points d and r. Therefore, the point "r" will be able to provide the point P with horizontal movement of an amount identical to that provided by the point R.

In accordance with the above-mentioned simple method, it is possible to determine a curve $\alpha'$ amended from the curve $\alpha$. If a drive rolling element is made to roll on the amended curve $\alpha'$, the element forms an envelope that determines the shape of the teeth 12. Therefore, the amended curve $\alpha'$ becomes an actual curve $\alpha$ of a practical transmission apparatus.

Now, a description will be made on how to determine the outer shape of the wave generator, which enables constant speed rotation of the carrier element when the shape of the teeth 12 is left unchanged.

In FIG. 7B, to begin with, a vertial line is drawn from the intersecting point R of the curves $\alpha$ and $\beta$ to the line $\gamma$ so as to obtain an intersecting point "d". Subsequently, a circle is depicted about a point P so as to pass through the point "d". A point "r" is then determined as an intersecting point of the circle and the curve $\alpha$ passing through the point R. This point "r" becomes a point located on a curve amended from the curve $\beta$. This method is repeated with each point. As a result, an amended curve $\beta'$ is determined. The drive rolling element is then made to roll on the amended curve $\beta'$ so as to form an envelop which determines the outer shape of the wave generator. It should be understood that in FIG. 6B, the amended curve $\alpha'$ is used for equalizing the amount of movement of the curve $\beta$ to the amount of movement of the point P on the carrier element. Thus, according to the amended curves $\alpha'$ and $\beta'$, each drive rolling element is able to rotate the carrier element by an equal amount.

The above-mentioned relationship at the curves $\alpha$ and $\beta$ will be explained with reference to an actual transmission apparatus as in FIG. 8.

Figure 8:
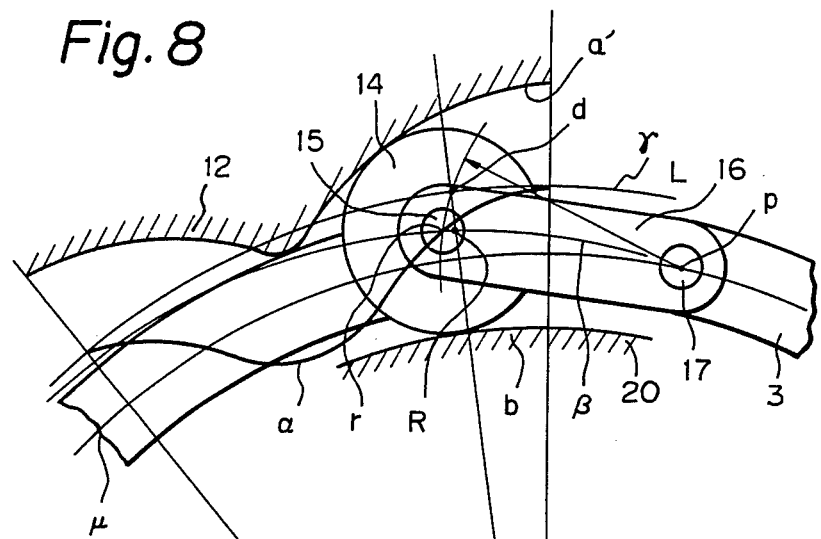
FIG. 8 is an explanatory schematic view for illustrating the method of producing amended curves $\alpha$ and $a'$ for an actual transmission apparatus.
Figure 9:
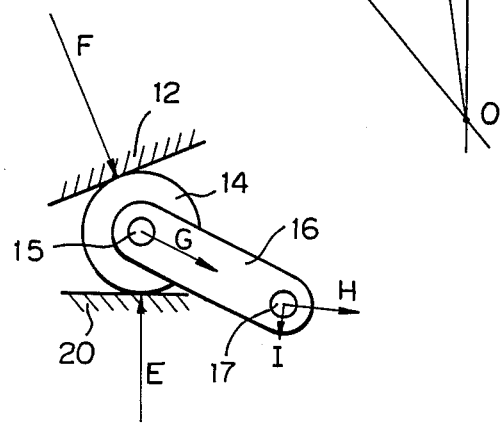
FIG. 9 is an explanatory view for illustrating the relationship among forces acting on the drive roll elements, the connecting member, and the carrier element.

In FIG. 8, an intersecting point R of the curves $\alpha$ and $\beta$ is first determined. Subsequently, an intersecting point d of a line passing through the points O and R and the circle $\gamma$ is determined. A circle is then depicted about a point P on the circle $\mu$ so as to pass through the point d. Thus, an intersecting point r of the curve $\beta$ and the depicted circle is determined. The point "r" becomes a point on an amended curve $\alpha$. The center of rotation of the drive rolling element 14 is moved along the amended curve $\alpha$, therefore, the drive rolling element 14 forms an envelope that corresponds to an amended shape a' of the wave-shaped teeth 12. Thus, when the shape of the teeth 12 is amended so as to become a curve a', the rotation of the wave generator at a constant speed will cause unequal speed rotation of the drive rolling element 14. However, the point P of the carrier 3 will always move at a constant speed. As a result, a smooth transmission operation is ensured.

Figure 11A:
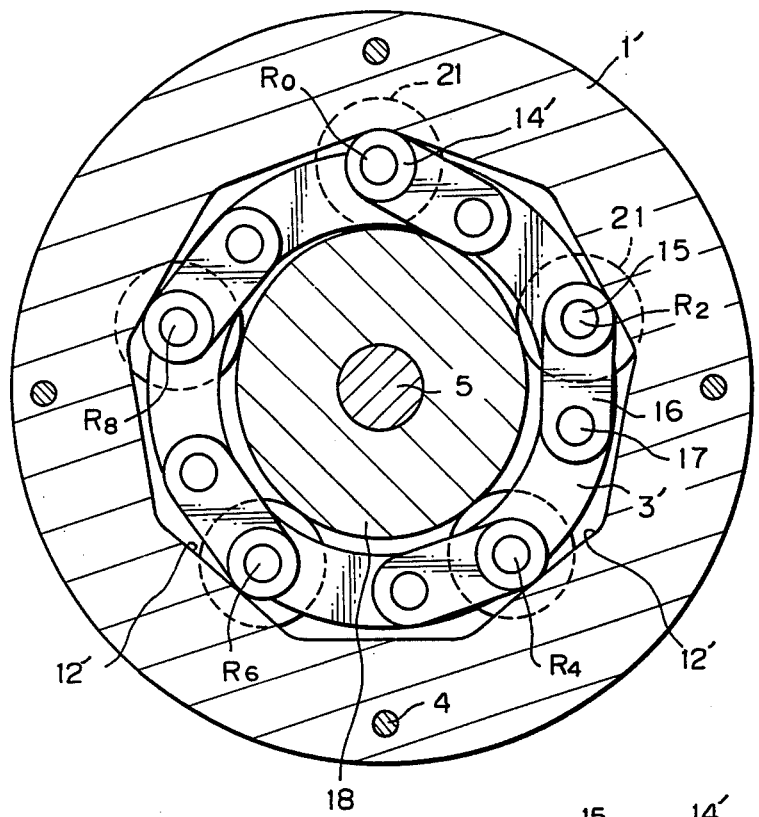
FIG. 11A is a cross-sectional view taken along the line XI—XI of FIG. 10.

If the shape of the teeth is not amended, the shape of the wave generator 40 has to be amended for achieving constant rotation of the carrier element 3. This is easily achieved by employing the above-explained method. In the embodiment of FIG. 11A, the internal teeth of the annular casing 1 have straight line portions for the purpose of simplifying the teeth-cutting operation. However, in such case, a complicated shape wave generator is necessary to obtain constant and smooth rotation of the carrier.

In the transmission apparatus of the present invention, if the shape of the internally toothed element is predetermined, the shape of the wave generator must be determined accordingly. If the shape of the wave generator is predetermined, conversely, the shape of the teeth of the internally toothed element must be determined accordingly.

The speed changing ratio of the transmission apparatus of the present invention can be obtained as follows. As stated in connection with the illustration of FIG. 4, the number of the intersecting points of the curves $\alpha$ and $\beta$ moving in the same direction as the curve $\beta$ is $n+1$, if the number of teeth of the internally toothed element 13 is n. The number of the intersecting points moving in the reverse direction is n−1. Since the intersecting points of the curves α and β are approximately equidistantly arranged, the intersecting points moving in the same direction as the curve β are spaced apart from one another at a pitch less than the wavelength (ω) of the teeth of the element 13 by the amount $$\frac{1}{n+1} \cdot \omega,$$

and the intersecting points moving in the reverse direction to the curve β are spaced apart from one another at a pitch longer than the wavelength (ω) of the teeth of the element 3 by the amount $$\frac{1}{n-1} \cdot \omega.$$

Since the curves α and β need to be slightly amended, the pitch of the two adjacent intersecting points might not be equal to one another.

In the transmission apparatus of FIG. 1, having nine teeth (n=9), the pitch of the two adjacent intersecting points moving in the same direction as the curve β is shorter than the wavelength (ω) of the teeth 12 by an amount $$\frac{1}{n+1} \omega = \frac{1}{10} \omega,$$

as shown in FIG. 4. However, the pitch of the two adjacent intersecting points moving in the reverse direction to the curve β is longer than the wavelength (ω) of the teeth 12 by an amount $$\frac{1}{n-1} \omega = \frac{1}{8} \omega.$$

When the wave generator 40 is rotated, the curve β is also rotated or moved rightward in FIGS. 4 and 5. Thus, when the curve β is moved by an amount of one pitch (ω), the drive rolling elements 14 move in the same direction as the curve β by an amount $$\frac{1}{n+1} \omega$$

or move in the reverse direction to the curve β by an amount $$\frac{1}{n-1} \omega.$$

Since one revolution of the wave generator 40 corresponds to n pitch movement of the curve β, the drive rolling elements 14 will move in the same direction by an amount $$\frac{n}{n+1} \cdot \omega$$

or will move in the reverse direction to the wave generator by an amount $$\frac{n}{n-1} \cdot \omega.$$

Since the pitch ω of the teeth is equal to one nth of a complete revolution, the drive rolling elements 14 will roll by one (n+1)th of a complete revolution in the same direction as the wave generator or the drive rolling elements 14 will roll by one (n−1)th of a complete revolution in the reverse direction to the wave generator. Accordingly, when the number of teeth is n, the speed change ratio is $$\frac{1}{n+1}$$

in the case of the same direction, while the speed change ratio is $$\frac{1}{n-1}$$

in the case of the reverse direction.

In the transmission apparatus of FIG. 1, the speed change ratio is 1/10 in the case of the same direction.

When the wave generator 40 radially presses one of the drive rolling elements 14 under the force of E, the drive rolling element 14 rolls along the teeth 12 and is subjected to a reaction force F from the tooth surface "a" of the teeth 12. Thus, the composite force G of the two forces E and F acts on the associated connecting elements 16, thereby causing the carrier element 3 to rotate. That is, the carrier element 3 generates a drive force H. At this stage, it should be understood that the generation of the drive force H by the carrier element 3 takes place only when the drive rolling element 14 is pressed against one of the teeth bottoms by the wave generator 40.

In FIG. 4, when the wave generator 40 rotates by an angle "θ", the carrier element 3 generates a drive force in association with the drive rolling elements 14 existing in the intersecting points $R_1$ through $R_5$. However, the carrier element 3 does not generate any drive force in association with the drive rolling elements 14 existing in the intersecting points $R_7$ through $R_9$ and $R_0$. With the drive rolling element 14 existing at the intersecting point $R_6$, the carrier element 3 cannot generate any drive force before the point $R_6$ moves past the tooth peak. It begins to generate drive force as soon as the point $R_6$ moves past the tooth peak.

It should be noted that in order to enable the carrier element 3 to constantly generate a drive force, it is necessary for at least one drive rolling element 14 to contribute to urging the carrier element 3 to move. This is an indispensable requirement for constructing the transmission apparatus of the present invention. However, as many drive rolling elements 14 as possible should preferably be provided, so that such many drive rolling elements 14 are able to equally contribute to the moving of the carrier element 3.

The foregoing description related to the case of design of the transmission apparatus assuming the wave generator 40 had an eccentric cam element 18 and a bearing unit consisting of a plurality of supporting rolls 19 and a ring element 20. However, when the shape of the teeth 12 of the internally toothed element 13 is preselected, the shape of the wave generator 40 may be designed so as to have a complicated specific outer shape.

On the other hand, when the outer shape of the wave generator 40 is first determined, the curve β, i.e., the locus of the center of the drive rolling element 14 around the wave generator 40, is accordingly determined. Thus, from the determined curve $\beta$, the curve $\alpha$ can be determined. That is, for example, in the case where the drive rolling elements 14 roll in the same direction as the wave generator 40, if the speed change ratio is $1/n+1$, the curve $\beta$ is compressed or shrunken so that the wavelength of the curve $\beta$ becomes $1/n$, while keeping the same wave width. As a result, the compressed curve $\beta$ forms an amended curve $\alpha$. Further, amendment is made so as to connect the drive rolling elements to the carrier element by means of the connecting elements. Thus, the amended curve $\alpha$ is determined. After determination of the curve $\alpha$, the shape of the teeth is determined by an envelope formed by the rolling of the drive rolling elements in accordance with the amended curve $\alpha$. However, it can be very difficult to precisely machine such a complicated shape of the teeth. Therefore, it is advantageous for machinability and productivity that the shape of the wave generator be complicated but the shape of the teeth be simple.

Further, as described later in detail, the positions for generating a drive force on the carrier element are preferably located so as to be point symmetric with respect to the center of the input shaft 5. This is to enable distribution of the load, and thus equalization of the load, and prevention of vibration and noise.

Figure 10:
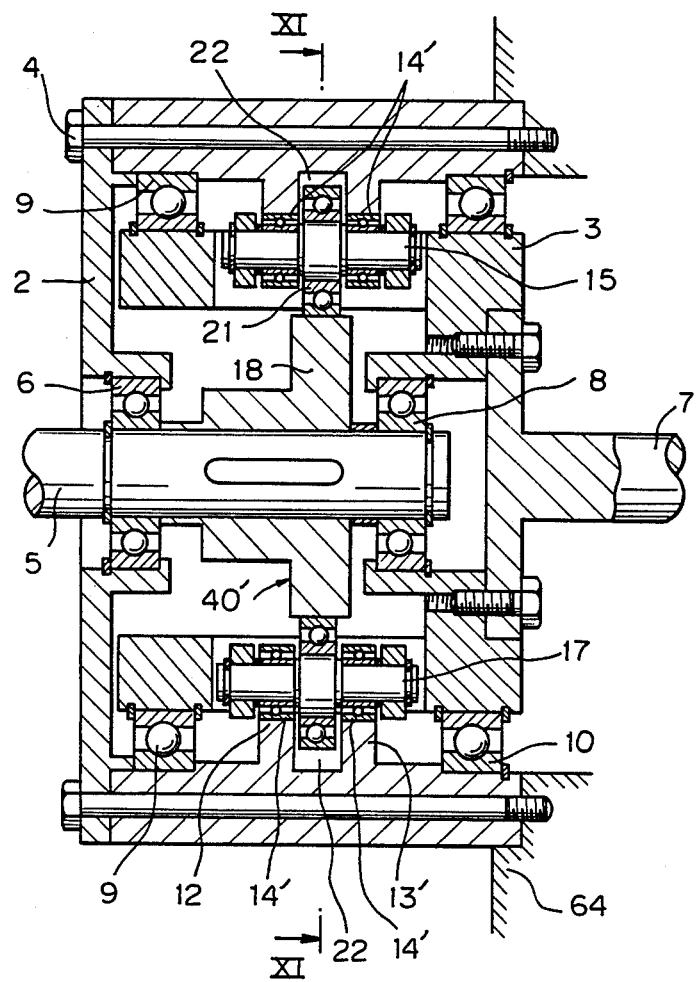
FIG. 10 is a vertical cross-sectional view of a transmission apparatus according to another embodiment of the present invention.

FIGS. 10 and 11A illustrate another embodiment of the transmission apparatus. In the illustrations of FIGS. 10 and 11A, elements the same or similar to those in FIGS. 1 and 2 are designated by the same reference numerals or the same reference numerals with apostrophes.

Figure 11B:
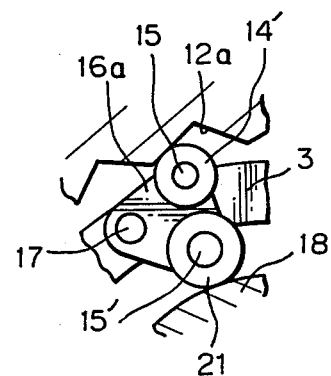
FIG. 11B is a partial view for illustrating a modified arrangement of drive roll elements and a guide roll element.

It should be first noted that the embodiment of FIGS. 10 and 11A include internally toothed element 1' having a linear tooth shape as best shown in FIG. 11A. It will be understood that in the transmission apparatus, when a wave generator 40' carries out one complete revolution, each drive rolling element 14' rotates by an angle determined by the speed change ratio of the apparatus. Therefore, a relative slip occurs between the drive rolling elements 14' and the wave generator 40' during the operation of the apparatus. In order to prevent such a relative slipping motion, there is provided in the embodiment of FIGS. 10 and 11A a guide rolling element 21 mounted on each support shaft 15 concentric with the associated drive rolling element 14'. The guide rolling element 21 of each support shaft 15 is disposed so as to be in rolling contact with the outer circumference of a cam element 18. However, the above-mentioned concentric mounting of the guide rolling element 21 with the associated drive rolling element 14' on a common support shaft 15 is not indispensable. For example, as shown in FIG. 11B, a guide rolling element 21 may be mounted on a support shaft 15' which is different from a shaft 15 on which the associated drive rolling elements 14' are mounted. Thus, a connecting member 16a has a substantial triangular shape. In FIGS. 10 and 11A, the cam element 18 and all guide rolling elements 21 construct the wave generator 40' of this embodiment. The cam element 18 is fixedly mounted on an input shaft 5. The drive rolling elements 14' formed by conventional bearings are arranged so as to be in rolling contact with the teeth 12' of the internally toothed element 13'. Thus, rolling contact is established between the teeth 12' of the element 13' and the drive rolling elements 14' as well as between the guide rolling elements 21 and the wave generator 40'. Thus, no slip motion occurs in the apparatus.

In the embodiment, each guide rolling element 21 is able to have a diameter larger than that of the associated guide rolling elements 14' and is, therefore, located in an annular groove 22 axially centrally formed in the teeth 12' of the internally toothed element 13'. It should be noted that with each guide rolling element 21, there is provided a pair of drive rolling elements 14' on both axial sides of the guide rolling element 21. The drive rolling elements 14' roll along the tooth surfaces axially spaced apart from one another via the annular groove 22 when the elements 14' are subjected to radial displacement given by the guide rolling element 21 of the wave generator 40'. In the state illustrated in FIGS. 1 or 10, when the wave generator 40' rotates clockwise, the drive rolling elements 14' identified as elements $R_2$ and $R_4$ operate so as to move a carrier element 3'. On the other hand, when the wave generator 40' rotates counterclockwise, the drive rolling elements 14' identified as elements $R_6$ and $R_8$ operate so as to move a carrier element 3'. That is, the carrier element 3' always generates only unsymmetric drive force about the axis of the input shaft 5. In addition to such unsymmetric generation of drive force, the eccentric arrangement of the wave generator 40' causes vibration in the transmission apparatus when the wave generator 40' rotates at high speed.

Figure 12:
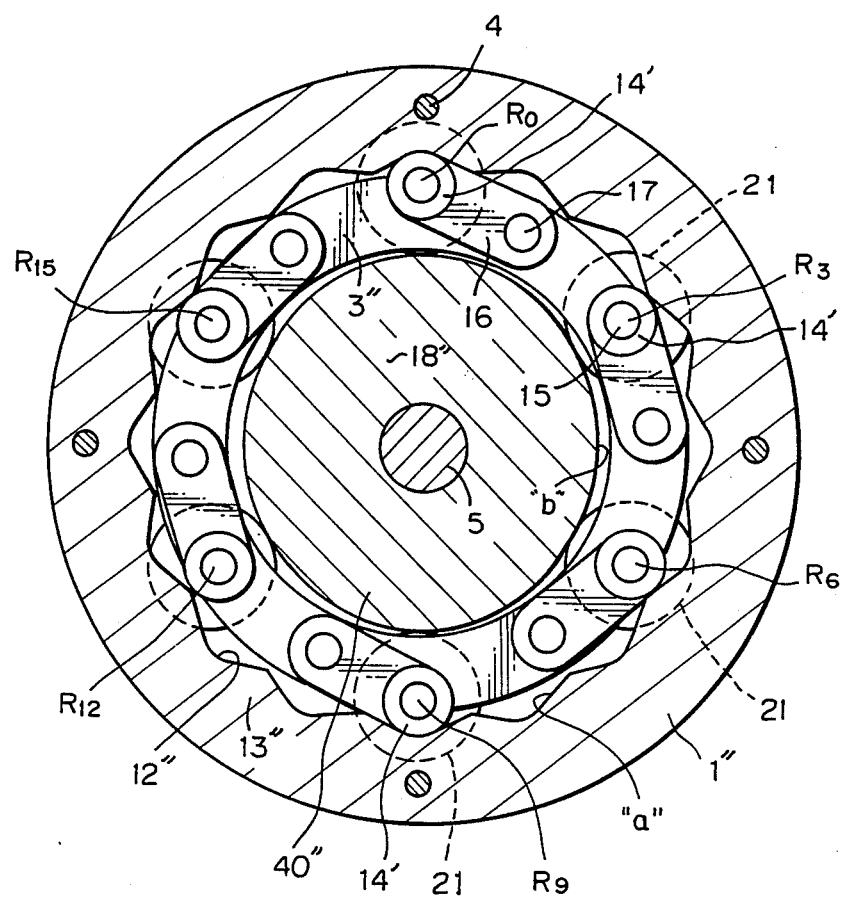
FIG. 12 is a cross-sectional view of a transmission apparatus of the present invention, having drive roll elements arranged at points symmetric with respect to the axis of an input shaft.

In order to eliminate such causes of vibration and noise, the transmission apparatus of FIG. 12 is improved by making the wave generator 40'' symmetric in shape and symmetric in arrangement with respect to an input shaft 5. Further, an improvement is made so that the generation of the drive source by the carrier element 3'' takes place symmetrically with the axis of the input shaft 5.

Figure 13:
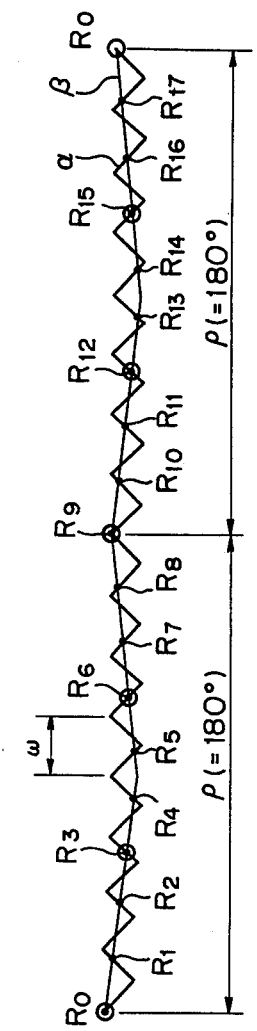
FIG. 13 is an explanatory schematic view for illustrating the position of the drive roll elements of the transmission apparatus of FIG. 12 by the use of the curves $\alpha$ and $\beta$.

FIG. 13 illustrates the curves $\alpha$ and $\beta$ of the transmission apparatus of FIG. 12.

An internally toothed element 13'' is formed with 16 teeth $(=2\times8)$. The curve $\beta$ has a wave shape of two cycles (two wavelength) per one revolution of the wave generator 40''. Therefore, for each wavelength (or one cycle) of the curve $\beta$, there are 8 teeth. Therefore, n is defined as equal to 8.

In the apparatus of FIG. 12, the drive rolling elements 14' are arranged at six intersecting points $R_0$, $R_3$, $R_6$, $R_9$, $R_{12}$, and $R_{15}$, illustrated in FIG. 13, which move in the same direction as the curve $\beta$.

When the wave generator 40'' rotates clockwise (i.e., when the curve $\beta$ of FIG. 13 moves rightward), the drive rolling elements 14' identified as the elements $R_3$ and $R_{12}$ which are symmetric with respect to the input shaft 5 urge rotation of the element 3'' while generating a drive force. On the other hand, when the wave generator 40'' rotates counterclockwise, the drive rolling elements 14' identified as the elements $R_{15}$ and $R_6$, which are also symmetric with respect to the input shaft 5, urge the carrier element 3'' to exert a drive force. Therefore, it will be understood that the carrier element 3'' is not subjected to any unbalanced force. Further, as the wave generator 40'' is shaped so as to be point symmetric with respect to the input shaft 5, the rotation of the wave generator per se does not generate any vibrating force. Therefore, the transmission apparatus of FIG. 12 is able to smoothly operate without any vibration and noise.

In the embodiment of FIG. 12, the drive rolling elements 14' located at one of six positions around the wave generator 40'' urge the carrier element 3'' to generate drive force during each half rotation of the wave generator 40". However, if the entire size of the transmission apparatus is increased, more drive rolling elements 14' can be provided to be located at respective teeth 12" of the internally toothed element 13". Since the speed change ratio is determined by the number (n) of teeth of the internally toothed element 13" with respect to one wavelength of the curve $\beta$, the apparatus of the embodiment of FIG. 12 has a speed change ratio of $1/n+1=1/9$.

Since the drive rolling elements 14' are all located at the intersecting points of the curves $\alpha$ and $\beta$, the elements 14' always rotate in contact with the tooth surface "a" of the teeth 12" and the outer circumference "b" of the cam element 18". If these elements of the transmission apparatus are manufactured with a high accuracy, it is possible to produce a transmission apparatus with no substantial play and no backlash. However, if these elements are manufactured at a very high accuracy to completely eliminate play and backlash, the assembly of the apparatus would become complicated. Also, when the elements wear out after long operation of the apparatus, it would be difficult to repair the apparatus. These problems must be solved by another method. That is, in FIG. 4, the drive rolling elements are located at vertices of triangles enclosed by hatched portions. Therefore, if the drive rolling elements are disassembled and separated from the associated connecting elements 16, the separated drive rolling elements will be freely movable within the triangles. Accordingly, if some mechanism is adopted for enabling it to change the distance between the drive rolling elements and the associated connecting elements and if the drive rolling elements are assembled in such a manner that the drive rolling elements are pushed from inside the triangles toward the vertices, it will be possible to assemble an apparatus free from play and backlash. Moreover, it is possible to compensate for wear of the drive rolling elements.

Figure 14:
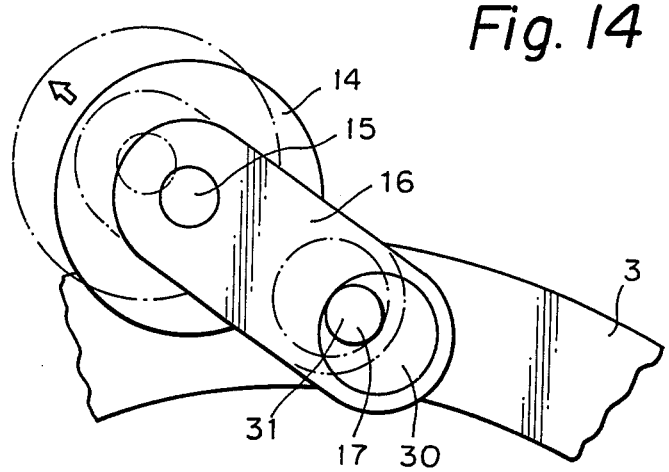
FIG. 14 is a schematic view of an example of a position adjusting unit for adjusting the position of the drive roll elements with respect to the carrier.

As shown in FIG. 14, each drive rolling element 14 is pivoted to the connecting element 16 by means of the support shaft 15, and the connecting member 16 is in turn swingably connected to the carrier element 3 by means of the support shaft 17. Therefore, if the connecting element 16 is connected to the carrier element 3 via a bushing 30 having an eccentrically arranged bore 31 in which the support shaft 17 is mounted, it is possible to adjust the relative position of the drive rolling element 14 to the carrier element 3 by rotating the bushing 30. In FIG. 14, when the bushing 30 is rotated 180° degrees, the connecting element 16 is shifted from a position indicated by solid line to a position indicated by a dashed line. Accordingly, the drive rolling element 14 is also shifted to the position indicated by a dashed line and spaced away from the carrier element 3. As a result, play due to wear of the drive rolling element can be eliminated. That is, the above-mentioned bushing 30 can be considered a position adjusting unit.

Figure 15:
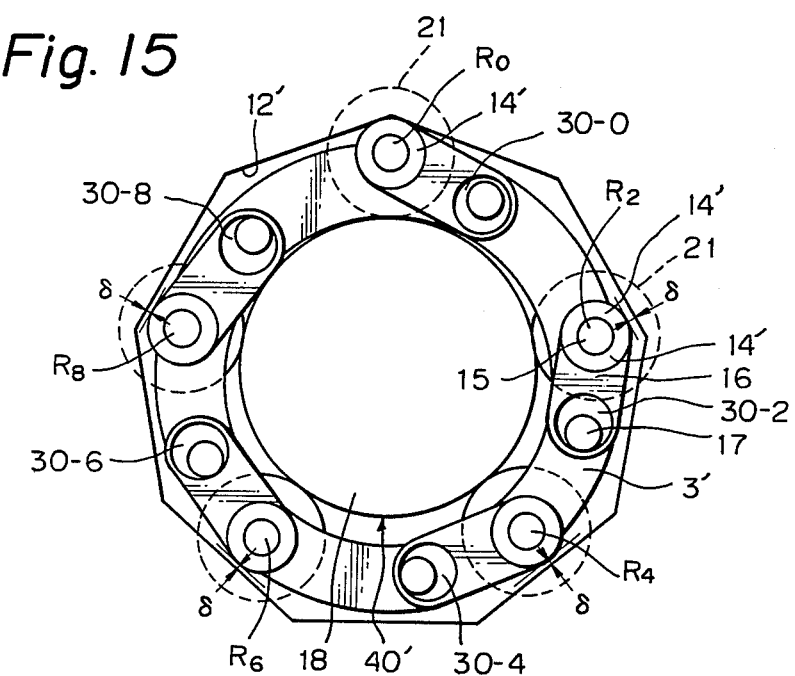
FIG. 15 is a schematic view illustrating an operating state of the position adjusting unit.

FIG. 15 schematically illustrates an embodiment in which the above-mentioned position adjusting unit consisting of the bushing 30 is accommodated in each connecting element 16. In the illustrated state, the drive rolling elements 14 identified as elements $R_2$ and $R_4$ are shifted toward the carrier element 3' by the use of the bushings 30-2 and 30-4, while the drive rolling elements $R_6$ and $R_8$ are shifted away from the carrier element 3 by the use of the bushings 30-6 and 30-8. The drive rolling element $R_0$ is left unchanged. As a result, a gap $\delta$ appears between the drive rolling elements $R_2$ through $R_8$ and the teeth 12' or the associated guide rolling elements 21 and the cam element 18 of the wave generator 40'. Accordingly, by utilization of the above-mentioned gap $\delta$, it is possible to easily take the drive rolling elements 14 out of the space between the internally toothed element 13' and the cam element 18 and to easily insert the drive rolling elements 14' into the same space. For example, it is possible to easily replace the worn drive rolling element 14' with new drive rolling elements. After replacement, by the use of the position adjusting units, i.e., the bushings 30, the new drive rolling elements 14' can be swingly engaged with the tooth surface of the teeth 12' of the internally toothed element 13'. The guide rolling elements 21 can also be snugly engaged with the outer circumference of the cam element 18. Consequently, play and backlash can be completely eliminated.

In the embodiment of FIG. 15, the position adjusting unit consisting of the bushing 30 is illustrated as mounted on the support shafts 17. However, the unit may be mounted on the support shafts 15 of the drive rolling elements 14'. Similarly, the unit may be arranged in a different way. For example, the unit may be incorporated into each drive rolling element or each connecting element, as easily understandable to those skilled in the art. Therefore, it should be appreciated that an appropriate unit for adjusting the position of each drive rolling element should accommodated in the transmission apparatus of the present invention.

FIG. 16 illustrates an example of a unit for adjusting the position of each drive rolling element by the use of an electrically or electronically controlled actuator means. That is, the actuator means can even be used for precisely adjusting the position of each drive rolling element in response to a command signal from an electronic computer.

In FIG. 16, an actuator 34 comprised of an electrostrictive material, such as lead zirconate titanate (PZT), or a magnetostrictive material is incorporated at a middle portion of a connecting element 16' separated into two pieces. Thus, in response to supply of an electric signal to the actuator 34, the connecting element 16' is changed in its length. As a result, a support shaft 15 on which a drive rolling element (not shown in FIG. 16) is mounted is changed in its position. Consequently, the position of the drive rolling element can be adjusted.

As is described later, in the transmission apparatus of the present invention, if the carrier element is fixed and if the internally toothed element is made free to rotate, an output rotation is derived from the internally toothed element in response to an input rotation of an input shaft. At this state, if an electric signal is input to the actuator incorporated into each connecting element after the termination of the input rotation, mechanical displacement of each connecting element is caused. As a result, the internally toothed element is rotated in response to the magnitude of the mechanical displacement of each connecting element. Thus, it is possible to achieve highly precise position control of the transmission apparatus by the use of a control unit different from a control unit mechanically associated with the input shaft of the apparatus.

It should be understood that since the actuator consisting of electrostrictive material, such as PZT, is able to effect displacement on the micrometer order, the provision of such an actuator enables micrometer order position control of the transmission apparatus.

In the field of position control of a controlled object, the control unit is generally constructed by a motor, a transmission apparatus, and a detection unit. Thus, a command signal from an electronic computer is input into the motor so as to cause rotation of the controlled object. The rotation of the object is detected and is compared with the command signal. The motor is adjustably rotated until the difference between the detected rotation and the command signal becomes zero. This is a conventional servo mechanism for a position control of a mechanical object. However, in the conventional position control unit, there are many non linear components, such as play and backlash, in the drive mechanism. Further, resolution of the detection unit is insufficient. As a result, it is often impossible to make the difference between the detected result of the detection unit (the detected rotation of the mechanical object) and the command signal zero.

However, by employment of the transmission apparatus of the present invention, all structural elements, such as the internally toothed element, drive rolling elements, connecting elements, and carrier element, are precisely manufactured on a micrometer order. In addition, the employment of the above-mentioned actuator consisting of an electrostrictive material, such as PZT, makes it possible to achieve position control of an output shaft on the micrometer order. Consequently, if the transmission apparatus of the present invention is incorporated into a position control servo mechanism, very highly accurate position control of a controlled object can be achieved.

In FIG. 17, an embodiment is shown in which an actuator 34' including a piston 51 and a cylinder 52 is incorporated in a connecting member 16". The piston 51 of the actuator 34' mounts, on its outer end, a support shaft 15 on which a drive rolling element (not shown) is mounted. The piston 51 is moved in response to supply of a pressurized fluid into the cylinder 52. The actuator 34' is different from the actuator 34 of FIG. 16 in that the actuator 34' is effective for providing the drive rolling element with a larger displacement via the support shaft 15. The actuator 34' is also effective for absorbing vibration appearing in the drive rolling element during the operation of the transmission apparatus.

FIG. 18 illustrates an embodiment of the transmission apparatus, in which an actuator for causing displacement of a drive rolling element is incorporated in a carrier element. In FIG. 18, a support shaft 17 supporting a connecting element 16''' is mounted on a slide support 33. The slide support 33 is in turn mounted in a guide 32 formed in a carrier element 3'. An actuator 34" consisting of a piezoelectric material is arranged between the slide support 33 and the carrier element 3' so as to interconnect therebetween. When the actuator 34" is displaced by the impression of an electric signal to the actuator 34", the slide support 33 is slid in the guide 32, so that a drive rolling element 14 is moved away from or toward the carrier element 3'.

Referring again to FIG. 16, a load detection unit 35, such as a conventional strain gauge, is attached to the connecting element 16'. The load detection unit 35 detects a force acting on the drive rolling element mounted on the support shaft 15. Further, from an output signal of the load detection unit 35, it is possible to detect the contacting state of the drive rolling element with the teeth of the internally toothed element as well as the wave generator. Moreover, from the output signal of the load detection unit 35, it is possible to measure the accuracies of the shape of the teeth of the internally toothed element and the shape of the wave generator. On the basis of the detection and the measurement and by the use of the afore-mentioned actuator, it is possible to compensate for any structural imperfections remaining in the transmission apparatus. That is, by controlling the actuator, the drive rolling element can be appropriately displaced so as to compensate for such constructional imperfections. As a result, the performance of the transmission apparatus can be enhanced. Specifically, since the electrostrictive material of the actuator, such as PZT, has a high speed controllability, the performance characteristics of the transmission apparatus can be improved during the high speed rotation of the input shaft of the apparatus.

Figure 19:
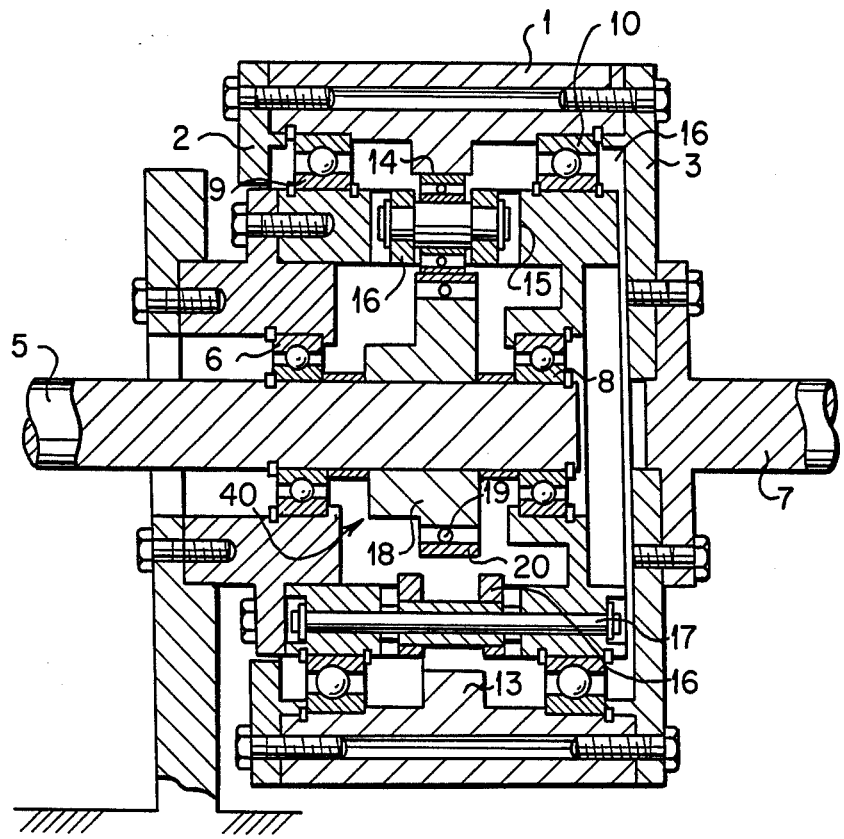
FIG. 19 is a vertical cross-sectional view of a transmission apparatus illustrating an embodiment of the invention having a fixed carrier element.

The speed reduction ratio of the transmission apparatus ranges from $\frac{1}{3}$ to approximately 1/80. If a higher speed reduction ratio is needed, two or more transmission apparatus must be disposed in multiple stages. One method of constructing the multistage transmission system is achieved by serially connecting the carrier element of a lower-stage transmission apparatus to the input shaft of a higher stage transmission apparatus. If the carrier element of the first-stage transmission apparatus is fixed as illustrated in FIG. 19; and if the internally toothed element is made free, the output is derived from the internally toothed element. Therefore, by connecting the internally toothed element of the first stage transmission apparatus to the input shaft of the next stage transmission apparatus, a multi-stage transmission system having therein a plurality of concentrically arranged transmission apparatus is formed. This multistage transmission system is advantageous, since the overall axial length of the connected apparatus can be relatively short.

In the transmission apparatus of the present invention, the structural elements are in rolling contact with one another. Therefore, friction loss can be very small. Accordingly, if a rotational input is given to the carrier element so that a rotation output is taken out of the input shaft, the rotation output can be a speed increase output. That is, the transmission apparatus of the present invention can be used as a speed increase gear.

If the carrier element of the first stage transmission apparatus is connected to the carrier element of the next stage transmission apparatus, the first stage apparatus operates as a speed reduction gear. The next stage apparatus operates as a speed increase gear. Thus, if the speed reduction ratio is 1/X and if the speed increase ratio is Y, the combined speed change ratio becomes Y/X. Therefore, by changing the values of X and Y, it is possible to obtain diverse speed change ratios. This is due to the low friction loss of the transmission apparatus of the present invention and due to the possibility of using the transmission apparatus of the present invention as a speed increase gear.

In the transmission apparatus of the present invention, when the drive rolling elements exist adjacent to the top of the teeth, no moving force is generated to be applied to the carrier element. Therefore, the drive rolling elements do not have to contact with the tooth surface or the wave generator when the elements exist adjacent to the top of the teeth. Accordingly, it is possible to modify the teeth shape. One complete rotation of the wave generator corresponds to the movement of the drive rolling element through one pitch between two adjacent drive rolling elements. The point where the drive rolling element is in contact with the wave generator is closely related to the point where the drive rolling element is in contact with each tooth of the internally toothed element. Accordingly, the shape of the teeth as well as the shape of the wave generator can easily be modified as required.

From the foregoing, it will be understood that, in the transmission apparatus of the present invention, the drive rolling elements roll along the tooth surface without play and backlash. Further, the drive rolling elements transmit a drive force by the rolling contact. Therefore, the transmission apparatus of the present invention can be very rigid. Also the apparatus has not only a high transmission efficiency but also highly precise controllability.

What is claimed is:

1. A transmission apparatus for changing the rotational speed between a first and a second shaft at a predetermined changing ratio, comprising:
    an annular casing having an inner surface;
    wave generator means having a cylindrical outer surface fixed to and rotatable with the first shaft;
    at least three drive rollers;
    carrier means, including first means rotatably mounting each of the drive rollers, connected to and rotatable with the second shaft for rotation within the casing, said first means including second means swingably supporting each of the rotatable drive rollers for permitting constant contact of the drive rollers with the outer surface of the wave generator means and the inner surface of the casing;
    the inner surface of the annular casing having teeth with a radial configuration selected to position each of the rollers at the intersection of first and second wave-shaped curves, said curves defining an envelope formed by the teeth on the inner surface of the casing and the outer surface of the wave generator means during rolling movement of the drive rollers on the outer surface of the wave generator means at times when the carrier means and the wave generator means are rotating relative to one another at the predetermined changing ratio, the selected radial configuration being effective to provide constant physical contact of the drive rollers with the outer surface of the wave generator means and the teeth on the inner surface of the casing;
    the first curve corresponding to a line passing through the rotational centers of the drive rollers at times when the rollers roll along the teeth on the surface of the casing;
    the second curve corresponding to a line passing through the rotational centers of the drive rollers at times when the rollers roll along the outer surface of the wave generator means; and
    the second curve having a wave length corresponding to an internal multiple of the wave length of the first curve with both first and second curves having the same amplitude.

2. The transmission apparatus of claim 1, wherein the first shaft is an input shaft, and the second shaft is an output shaft for decreasing the rotational output of the apparatus.

3. The transmission apparatus according to claim 1, wherein the second shaft is an input shaft, and the first shaft is an output shaft, for increasing the rotational output of the apparatus.

4. The transmission apparatus according to claim 1, wherein the drive rollers are angularly disposed at points of intersection of the first and second curves selected to move in the same direction as the direction of rotation of the wave generator means for rotating the wave generator means and the carrier means in the same direction.

5. The transmission apparatus according to claim 1, wherein the drive rollers are angularly disposed at points of intersection of the first and second curves selected to move in the direction opposite the direction of rotation of the wave generator means for rotating the wave generator means and the carrier means in opposite directions.

6. The transmission apparatus of claim 1, wherein the second means swingably supporting the drive rollers includes means for adjusting the positions of the drive rollers relative to the carrying means.

7. The transmission apparatus according to claim 6, wherein the position adjusting means for the drive rollers is operative to rotate the carrier means.

8. A transmission apparatus for changing the rotational speed between a first and a second shaft at a predetermined changing ratio, comprising:
    an annular casing having an inner surface;
    a wave generator means, including an eccentric cam element having an outer surface, fixed to and rotatable with the first shaft;
    at least three drive rollers;
    at least one guide roller associated with each drive roller;
    carrier means, including first means rotatably mounting each of the drive rollers and the associated guide roller adjacent thereto, connected to and rotatable with the second shaft for rotation within the casing, said first means including second means swingably supporting each of the rotatable drive and guide rollers for permitting constant contact of the guide rollers with the outer surface of the wave generator means and constant contact of the drive rollers with the inner surface of the casing;
    the inner surface of the annular casing having teeth with a selected radial configuration to correspond to a predetermined circularly extended pleated curve which effectively positions each of the drive rollers at the intersection of first and second wave-shaped curves, said curves defining an envelope formed by the guide rollers on the outer surface of the wave generator during rolling movement of the drive rollers on the teeth of the inner surface of the casing at times when the carrier means and the wave generator means are rotating relative to one another at the predetermined changing ratio, the selected configuration effectively providing constant physical contact of the guide rollers with the outer surface of the wave generator means and constant contact of the drive rollers with the teeth of the inner surface of the casing;
    the first curve corresponding to a line passing through the rotational centers of the drive rollers when the drive rollers roll along the teeth on the inner surface of the casing;
    the second curve corresponding to a line passing through the rotational centers of the drive rollers when the guide rollers roll along the outer cylindrical surface of the wave generator means; and
    the second curve having a wave-length corresponding to an integral multiple of the wave-length of the first curve with both first and second curves having the same amplitude.

9. The transmission apparatus of claim 8 wherein the selected radial configuration of the teeth is linear and corresponds to a linearly pleated circularly extending curve for providing a linear inner contact surface on the annular casing.

10. The transmission apparatus of claim 8 wherein the first shaft is an input shaft.

11. The transmission apparatus according to claim 8 wherein each drive roller is rotatably mounted on a corresponding third shaft, and each guide roller is rotatably mounted on a corresponding fourth shaft different from the respective third shaft.

12. The transmission apparatus of claim 10 wherein the drive rollers are equi-angularly disposed about the input shaft.

13. The transmission apparatus of claim 11 wherein the second means swingably supporting each of the drive and guide rollers include a triangularly configured member, and a shaft connecting said member to the carrier means.

14. The transmission apparatus of claim 11 wherein each of the corresponding third shafts for mounting the drive rollers are coaxial with each of the corresponding fourth shafts for mounting the guide rollers.

15. A transmission apparatus for changing the rotational speed between a first and a second shaft at a predetermined changing ratio, comprising:
  an annular casing having an inner surface, said annular casing being fixed to and rotatable with the first shaft;
  wave generator means having a cylindrical outer surface fixed to and rotatable with the second shaft;
  at least three drive rollers;
  fixed carrier means, including first means rotatably mounting each of the drive rollers for rotation within the casing, said first means including second means swingably supporting each of the rotatable drive rollers for permitting constant contact of the drive rollers with the outer surface of the wave generator means and the inner surface of the casing;
  the inner surface of the annular casing having teeth with a radial configuration selected to position each of the rollers at the intersection of first and second wave-shaped curves, said curves defining an envelope formed by the teeth on the inner surface of the casing and the outer surface of the wave generator means during rolling movement of the drive rollers on the outer surface of the wave generator means at times when the carrier means and the wave generator means are rotating relative to one another at the predetermined changing ratio, the selected radial configuration being effective to provide constant physical contact of the drive rollers with the outer surface of the wave generator means and the teeth on the inner surface of the casing;
  the first curve corresponding to a line passing through the rotational centers of the drive rollers at times when the rollers roll relative to the teeth on the surface of the casing;
  the second curve corresponding to a line passing through the rotational centers of the drive rollers at times when the rollers roll relative to the outer surface of the wave generator means; and
  the second curve having a wave length corresponding to an internal multiple of the wave length of the first curve with both first and second curves having the same amplitude.

16. A transmission apparatus for changing the rotational speed between a first and a second shaft at a predetermined changing ratio, comprising:
  an annular casing having an inner surface, said annular casing being fixed to and rotatable with the first shaft;
  a wave generator means, including an eccentric cam element having an outer surface, fixed to and rotatable with the second shaft;
  at least three drive rollers;
  at least one guide roller associated with each drive roller;
  fixed carrier means, including first means rotatably mounting each of the drive rollers and the associated guide roller adjacent thereto, connected to and rotatable with the second shaft for rotation within the casing, said first means including second means swingably supporting each of the rotatable drive and guide rollers for permitting constant contact of the guide rollers with the outer surface of the wave generator means and constant contact of the drive rollers with the inner surface of the casing;
  the inner surface of the annular casing having teeth with a selected radial configuration to correspond to a predetermined circularly extended pleated curve which effectively positions each of the drive rollers at the intersection of first and second wave-shaped curves, said curves defining an envelope formed by the guide rollers on the surface of the wave generator during rolling movement of the drive rollers on the teeth of the inner surface of the casing at times when the carrier means and the wave generator means are rotating relative to one another at the predetermined changing ratio, the selected configuration effectively providing a constant physical contact of the guide rollers with the outer surface of the wave generator means and a constant contact of the drive rollers with the teeth of the inner surface of the casing;
  the first curve corresponding to a line passing through the rotational centers of the drive rollers when the drive rollers roll along the teeth along the teeth on the inner surface of the casing;
  the second curve corresponding to a line passing through the rotational centers of the drive rollers when the guide rollers roll along the outer cylindrical surface of the wave generator means; and
  the second curve having a wave-length corresponding to an integral multiple of the wave-length of the first curve with both first and second curves having the same amplitude.

17. The transmission apparatus of claim 16 wherein the selected radial configuration of the teeth is linear and corresponds to a linearly pleated circularly extending curve for providing a linear inner contact surface on the annular casing.

* * * * *